United States Patent Office 3,461,905
Patented Aug. 19, 1969

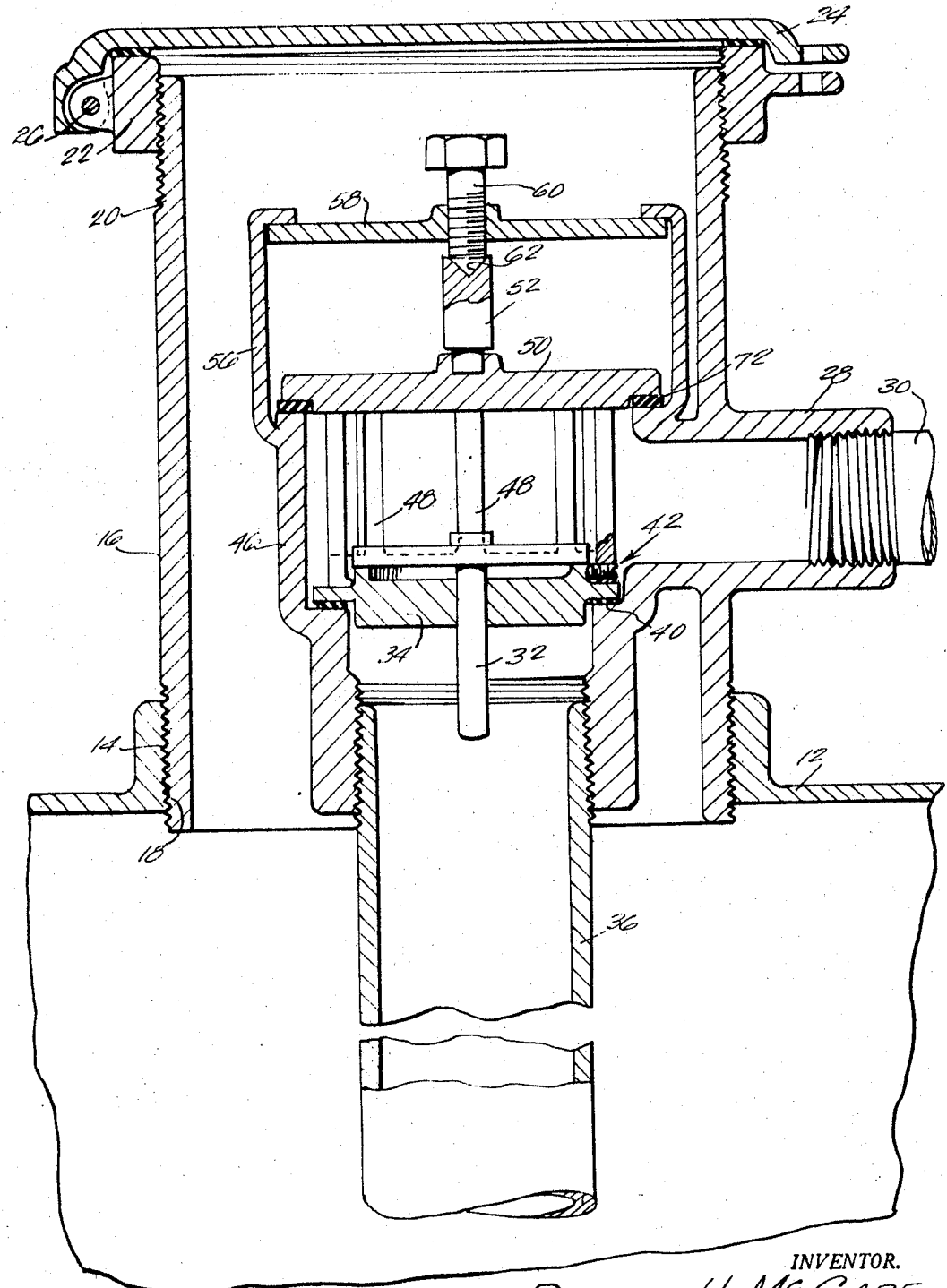

3,461,905
LIFETIME CHECK VALVE FOR GASOLINE
DISPENSING EQUIPMENT
Daniel U. McCabe, 601 N. Pottenger St.,
Shawnee, Okla. 74801
Filed July 3, 1968, Ser. No. 742,419
Int. Cl. B67d 5/04, 5/34, 5/38
U.S. Cl. 137—315         3 Claims

ABSTRACT OF THE DISCLOSURE

A valve installed in a gasoline dispensing equipment which provides information as to whether the valve is or is not operable by inspection so that one can readily determine what needs to be repaired. The case where a pump is losing its prime overnight is not provided by information available in valves of the present art, but by the device of the present invention, it is determined whether there is a hole in the line or the check valve is leaking without running a test which is true in the conventional valve.

---

The present invention relates to an apparatus to be installed on gasoline dispensing equipment, and more particularly relates to an improved check valve for eliminating costly repairs due to a device for providing information as to whether the valve is operable or needs repair, and for providing a construction that enables ready and quick repair or cleaning of such valve.

The conventional type of valves installed in gasoline dispensing equipment are disposed in a position just above the underground tank requiring it to be necessary that one has to excavate down to the tank incuding removing it from reinforced concrete before it is removed. Thus, these efforts are required before the valve can be reached, and in these cases, the only remedy is to replace the entire valve. Thus, it would be necessary to break the line if there is no union, which in many instances is the case, and then it is necessary to cut the line.

It is thus necessary and vital to have the line check valve working properly in order for the pump to function properly. In the case of a pump's losing its prime overnight, it is possible to know whether there is a hole in the line or the check valve is leaking, without running a test.

With the conventional valve, it is necessary to dig down to the tank and cut the line and cap it, also removing the pump, cap both ends of the line and put air pressure on the line in order to determine whether it is the valve or the line that is leaking or defective.

An object, therefore, of the present invention is to provide a lifetime check valve which is easily examined and provides ready information on whether the valve is defective or not, and in order to satisfy the objects, advantages and uses of the present invention.

The figure is a cross-sectional view of the lifetime check valve according to a preferred embodiment of the present invention and showing the component parts according to the best mode of construction of the invention.

Referring now to the drawing, there is shown an underground tank 12 to which there is provided a threaded female member 14 for receiving pipe 16 having a threaded male member 18 at the lower end and a threaded portion 20 at the upper end, to which is attached by threaded engagement a cover ring 22 for providing a cover cap 24, which is opened by pivotally raising the cap from a pivot rivet 26.

Intermediate the ends of the pipe 16 on one side thereof is an opening pipe 28. Pipe 28 connects with a pump, not shown, communicating with connecting pipe 30. The pump above referred to is the dispensing means in the gasoline dispensing equipment installed at the conventional gasoline service station. The pipe 28 communicates in the other direction with a poppet valve 32 which sits on a valve seat 34 and is a suction pipe stud 36. The poppet valve is constructed to include a valve gasket 40, and the poppet valve is disposed within the valve cage 46. A set-screw 42 is disposed in the poppet valve, as shown, positioned in an inner cage including extensions 48. The set-screw cooperates with a bib means diametrically opposite the cage, as shown. In the upper part of the valve cage 46 are extensions 48 of the poppet valve, extending from a valve cage plate 50, which plate in turn communicates force to a pressure staff 52, and which is within the upper portion of the valve cage extension 56. There is shown at the upper end of the valve cage extension 56 a pressure bar 58 which threadedly communicates at its center with a pressure bolt 60 and fits within the mating recess 62 of the pressure staff 52. The pipe 16 is constructed to extend itself and it may also be within a casing (not shown) that terminates at the surface in the fill cap 24 described above.

It is seen by operation of the construction of the present invention, of which the best mode of the construction is shown, that the check valve according to the present invention provides the necessary information as to whether the check valve is working properly in order for the pump (not shown) connected to and communicating with pipe 30 is functioning properly. Thus, in the case, where a pump is losing its prime overnight, it is therefore possible to determine sufficient knowledge as to whether there is a hole or leak in the pipe 16, or whether the check valve is leaking, without running any tests.

What is claimed is:

1. A check valve construction for information incident to gasoline dispensing equipment, comprising a connecting pipe from the earth's surface to an underground storage tank, a fill cap pivotally riveted to a hinge at the top of said pipe, the other end of the pipe being threadedly engaging in mating relation to a threaded opening in said underground storage tank, and intermediate opening in said pipe for connecting and providing communication from the underground storage tank through a suction stud, through a communicating poppet valve, through the intermediate pipe and thence to conventional pump means, said poppet valve being arranged in fixed relation within a valve cage to a valve cage plate, said valve cage plate being coupled by a pressure staff within a valve cage extension terminating in a pressure bar, said pressure bar having a central opening for providing threaded engagement to a pressure bolt threadedly engaging said pressure bar, and said pressure bolt providing adjustment of pressure applied through the pressure staff to the valve cage plate for regulating the position of said poppet valve.

2. The invention according to claim 1 wherein a valve gasket is disposed about the poppet valve, and also disposed about the mating surface of the valve cage plate and the valve cage plate seat.

3. The invention according to claim 2 wherein a set screw retains the inner valve cage and cooperates with a bib means.

References Cited

UNITED STATES PATENTS

| | | | |
|---|---|---|---|
| 1,702,719 | 2/1929 | Carlin | 137—363 XR |
| 2,333,415 | 11/1943 | Du Bois | 137—533.21 XR |
| 2,829,597 | 4/1958 | Patterson | 285—133 XR |

FOREIGN PATENTS 745,266  2/1956  Great Britain.

HENRY T. KLINKSIEK, Primary Examiner

U.S. Cl. X.R.

137—363, 533.21